US005388000A

United States Patent [19]

Bartenbach

[11] Patent Number: 5,388,000

[45] Date of Patent: Feb. 7, 1995

[54] ANTI-GLARE FITMENT

[76] Inventor: Christian Bartenbach, Rinner Strasse 39, A-6071 Aldrans, Austria

[21] Appl. No.: 166,702

[22] Filed: Dec. 14, 1993

[30] Foreign Application Priority Data

Jan. 15, 1993 [AT] Austria .................................. A53/93

[51] Int. Cl.[6] .............................................. G02B 27/00

[52] U.S. Cl. ..................................................... 359/596

[58] Field of Search ....................... 359/591, 592, 596; 126/600; 160/166.1, 173

[56] References Cited

U.S. PATENT DOCUMENTS

| | | | |
|---|---|---|---|
| 1,639,474 | 8/1927 | Whitmore | 359/596 X |
| 2,546,335 | 3/1951 | Friend | 88/57.5 |
| 2,874,612 | 2/1959 | Luboshez | 88/60 |
| 4,292,763 | 10/1981 | Barnes et al. | 49/64 |
| 4,699,467 | 10/1987 | Bartenbach et al. | 350/259 |

FOREIGN PATENT DOCUMENTS

| | | | |
|---|---|---|---|
| 0303107 | 7/1988 | European Pat. Off. | E06B 9/26 |
| 303107 | 7/1988 | European Pat. Off. . | |
| 0483994 | 10/1991 | European Pat. Off. | E06B 9/386 |
| 2574469 | 11/1984 | France | E06B 9/28 |
| 2923233 | 12/1980 | Germany . | |
| WO9103682 | 3/1991 | WIPO | F21S 11/00 |

*Primary Examiner*—Richard A. Wintercorn
*Attorney, Agent, or Firm*—Lorusso & Loud

[57] ABSTRACT

Anti-glare fitment with a plurality of elongate light-deflecting slats which are arranged above one another, at a distance from each other, are reflective on their upper surface and preferably have a cross-section which is upwardly curved in a concave manner, whereby the light-deflecting slats are, at least within an area, perforated.

18 Claims, 3 Drawing Sheets

ANTI-GLARE FITMENT

DESCRIPTION

Figure 1:
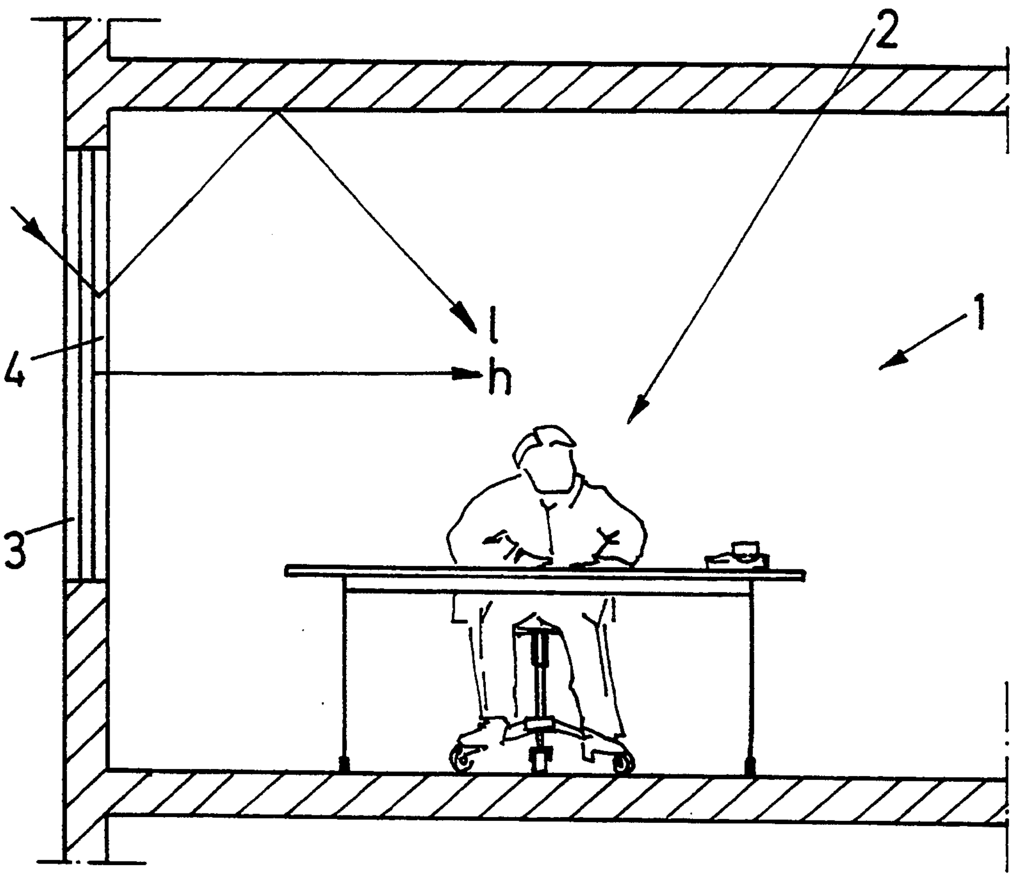

The invention concerns an anti-glare fitment with a plurality of elongate light-deflecting slats which are arranged one above another, at a distance from each other, and which are reflective on their upper surface and preferably have a cross section which is upwardly curved in a concave manner. The invention further concerns a light-deflecting slat for such an anti-glare fitment.

The nuisance caused in particular at the workplace, above all where display screens are in use, by high window luminance and the glare resulting therefrom generally stems on the one hand from the high luminance of the sky which can even occur when the sky is overcast, and on the other hand from reflections of sky radiation, which naturally also includes direct sunlight, on other buildings or, for example, on snow-covered ground. In any case, in practice, the light falling on a window opening is generally diffuse (i.e. its incidence is from all possible directions) whereby, clearly, higher luminance is to be expected from certain directions (for instance from the sun or a white wall opposite) than from others.

Drawn curtains and normal slatted blinds with closed slats do bring about satisfactory reduction in window luminance, this is however at the cost of a significant reduction in the amount of light admitted into the room, so that often artificial lighting has to be used even during the daytime.

Good anti-glare fitments are characterised in that on the one hand they only admit a small amount of light into the room below a critical angle, generally the horizontal angle (in special situations, other critical angles are also possible, however), and thus prevent glare, for example, at the workplace (dimming conditions), and on the other hand however, generally admit as much light as possible so that artificial lighting is not needed during daylight hours. This can be achieved with an anti-glare fitment in the form of a slatted blind which can be pulled up, with upwardly reflective and upwardly concave curved, light-deflecting slats, as is known from EP-A2-0303107.

The object of the invention is to provide an improved anti-glare fitment of the type described above, which while maintaining the required dimming conditions for particular areas of a room, admits a higher overall luminance into the room, and on the other hand allows a certain degree of view from the room to the outside through the anti-glare fitment.

This object is solved, according to the invention, by the features of claim 1.

The perforated construction of the deflecting slats permits a degree of partial transparency and thus allows at least a shadowy outlook from the room. At the same time however, the desired dimming effect of the anti-glare fitment is maintained.

To increase the effectiveness of the anti-glare fitment, that is generally to admit as much light into the room as possible from outside, it is advantageous that the light-deflecting slats are only perforated in a stripe, running along the longitudinal direction of the slats, which merely takes up part of the width of the slat, while the remaining part of the width of the slat has a continuously closed upper surface. The closed, reflective upper surface permits almost complete reflection of the light radiation which strikes it, while the perforated areas naturally take up some light. Due to the partial perforation of the slats, a high degree of efficiency can be achieved from the closed surfaces and a certain degree of transparency can nevertheless be achieved via the perforated areas.

In particular, in preferred embodiments, in which the upper, inner, longitudinal edge of each light-deflecting slat, which faces into a room, is higher in its normal operating position than the upper, outer, longitudinal edge which is parallel thereto and faces away from the room, it is advantageous when the perforated stripe extends longitudinally along the whole light-deflecting slat and widthwise from approximately the lowest point in the normal operating position significantly upwards towards the inner longitudinal edge. The outer area of the light-deflecting slat which is first struck by the light is thus provided with a closed, reflective surface which permits low-loss reflection. The area of the light-deflecting slat which rises up towards the back, and normally stops the view to the outside, is perforated and thus permits the desired transparency from the inside to the outside through the anti-glare fitment.

The invention is explained below in more detail with reference to examples of embodiments and by the use of drawings.

Figure 2:
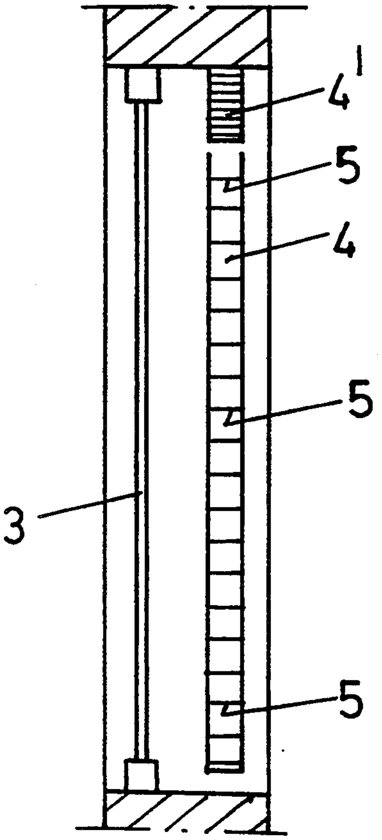
Figure 3:
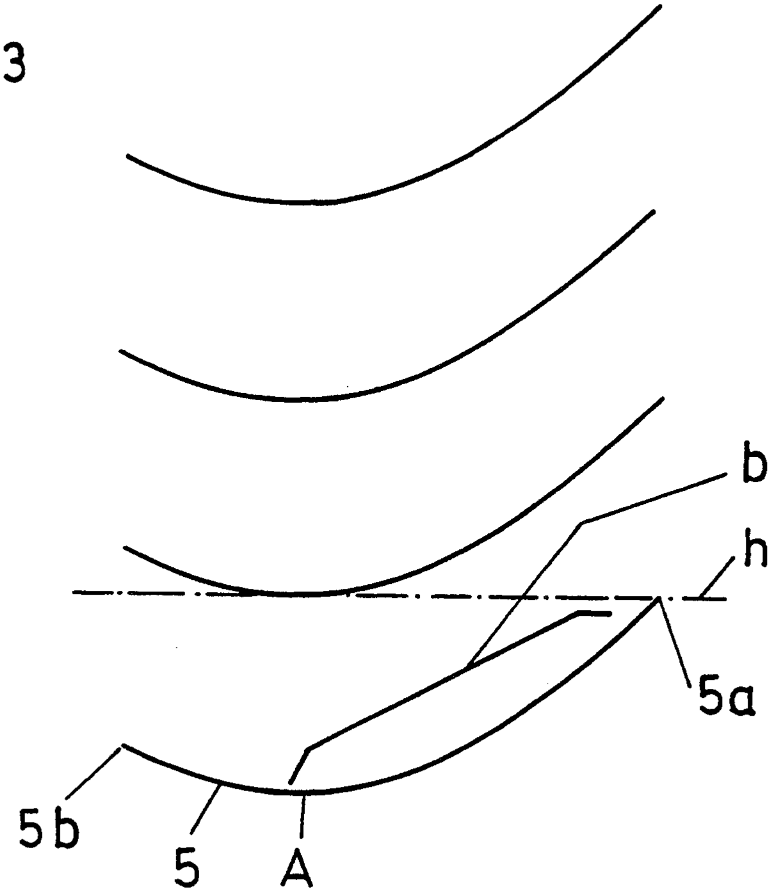
Figure 4:
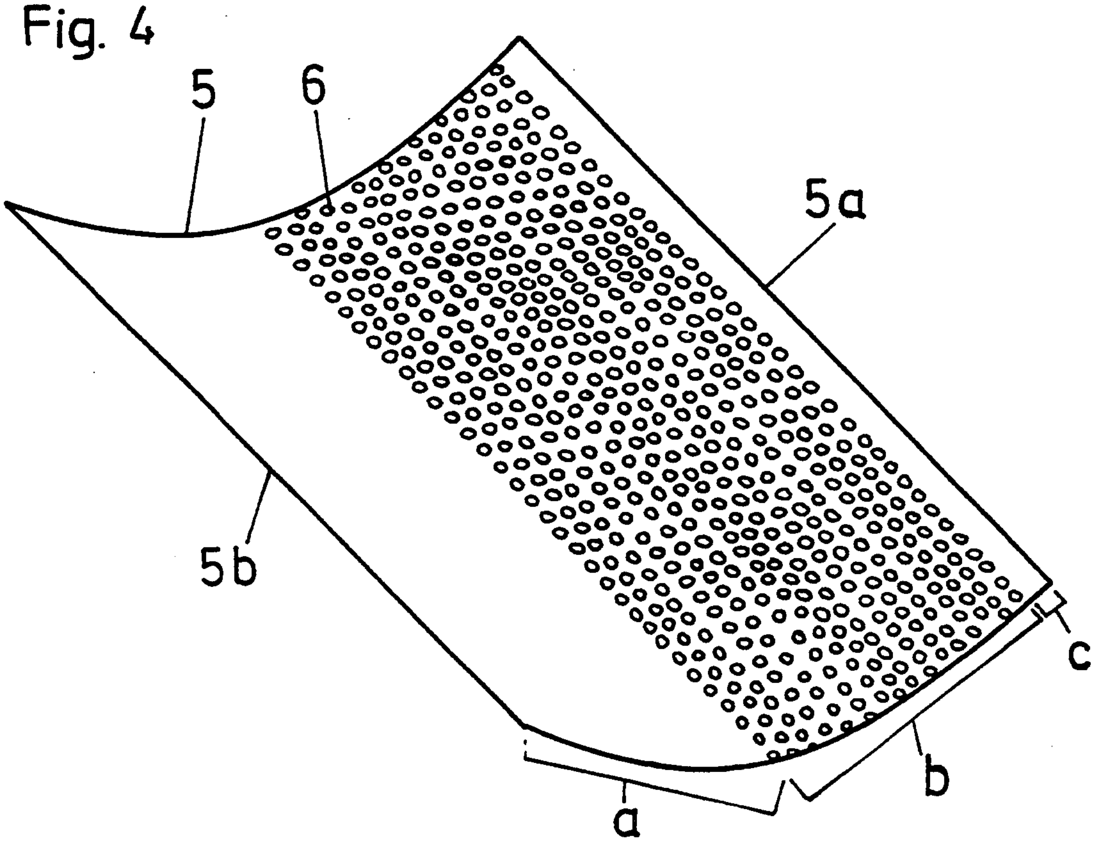
Figure 5:
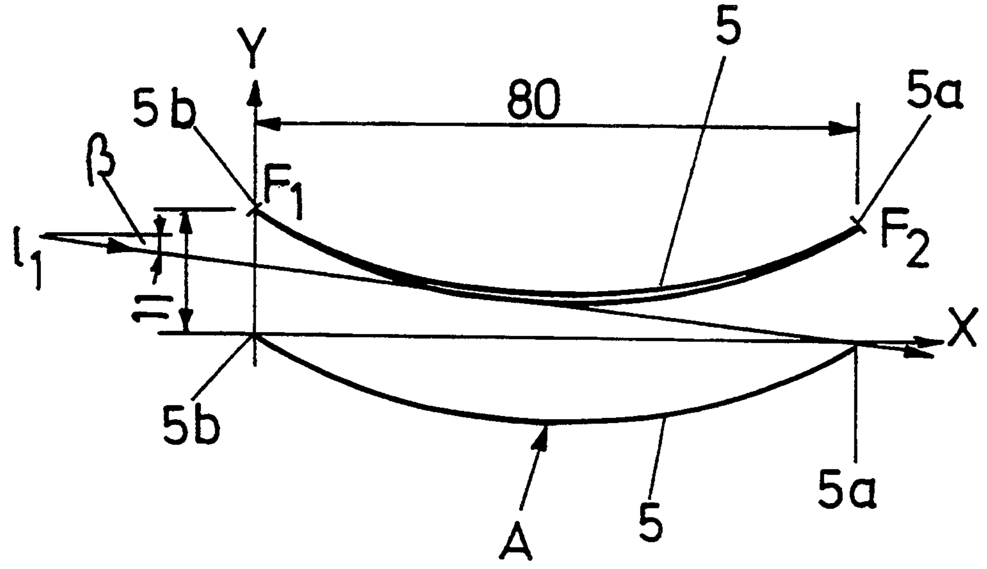

FIG. 1 shows a room with a workplace to be shielded from glare coming from a window, in which one of many possible arrangements of the anti-glare fitment according to the invention is shown schematically, FIG. 2 shows a schematic representation of an embodiment of the anti-glare fitment according to the invention, FIG. 3 shows a schematic cross-section of four light-deflecting slats of a further embodiment, FIG. 4 shows a representation in perspective of an embodiment of a light-deflecting slat according to the invention and FIG. 5 shows a cross-section of two light-deflecting slats of a further embodiment.

FIG. 1 shows a room 1, in part of which a workplace 2 is arranged. Light enters the room 1 from outside through an opening arranged as a window 3 allowing entry of light. The anti-glare fitment 4 arranged within the window 3 prevents the perceived luminance from the window from being too great, and thus from causing glare. In the example illustrated, the anti-glare fitment 4 thus deflects the light striking the room from outside in an angular range substantially above the horizontal critical beam h. A typical path of a light beam is referenced I.

In the embodiment shown, the anti-glare fitment is composed of a slatted blind 4 which can be pulled up, schematically illustrated in FIG. 2, the light-deflecting slats 5 of which have an upper reflective surface and preferably can be upwardly curved in a concave manner along their entire length. In addition in order to bring about light deflection in the top half of the room, the inner longitudinal edge 5*a* facing into the room is preferably at the same height (cf. FIG. 5) or higher (cf. FIGS. 3 and 4) than the outer longitudinal edge 5*b*. If no anti-glare measures are needed, the blind can be pulled up to the position referenced 4' in FIG. 2.

FIG. 3 shows four light-deflecting slats lying one above another belonging to an anti-glare fitment according to the invention. Clearly, in practice the anti-glare fitment would have more than four light-deflecting slats lying one above another, generally covering the whole height of the window. The light-deflecting slats 5 can be pulled up using pull cords (not shown) or similar means, in the manner of a slatted blind.

The upper surface of the light-deflecting slats 5 are reflective and in a preferred embodiment the aluminium light-deflecting slats are constructed with a bright aluminium surface. The reflective surfaces of the light-deflecting slats achieve a significantly directional reflection according to the known laws of reflection, whereby the reflective upper surface of the light-deflecting slat has a reflection factor of more than 85%, with a diffusion component of less than 20% in accordance with DIN 5036. The brightness of the reflective upper surface of the light-deflecting slats at an incident angle of 60° is more than 80% in accordance with DIN 67530.

The undersides of the light-deflecting slats are matt coated or painted to avoid glare from light beams reflected off the undersides, which enter the room downwardly at below an angle below the horizontal h. It is therefore advantageous if the reflection factor of the diffusely reflecting undersides of the light-deflecting slats is between 30% and 50%. Such a construction of the undersides is also advantageous to the partial transparency, from the inside to the outside through the anti-glare fitment, which is perceived by the viewer, as will be described below in more detail. The aforementioned reflection factor information relates to the upper surface area between and/or outside the perforations.

In order to be able to see through the anti-glare fitment to the outside, the light-deflecting slats 5 are perforated in stripes of a width b extending longitudinally along the slats, as can be seen, for example, in FIG. 4, which shows only part of the length of the slat.

The perforated stripe extends longitudinally along the entire light-deflecting slat and widthwise from approximately the lowest point A upwards substantially to the inner longitudinal edge 5*a*, which is higher than the outer longitudinal edge 5*b*, and, in the embodiment illustrated to approximately the height of the lowest point of the light-deflecting slat lying above it.

The outer edges of the slats are provided with a continuous reflective surface in the area a and thus enable a high degree of efficiency of the anti-glare fitment. For manufacturing reasons, and for optical reasons, it can be advantageous if the area of the light-deflecting slat 5 which borders the longitudinal edge 5*a* is provided with a surface which is continuous, that is to say not perforated, preferably a few millimeters in width.

The perforation can be performed advantageously by making a regular pattern of circular perforations as viewed from above, through the light-deflecting slats, as shown in FIG. 4. The perforations 6 can be advantageously arranged as rows of perforations along the length of the slat, which are staggered, and therefore produce an as uniform as possible perforation. From a technical manufacturing point of view, the perforations 6 can, for example, be made by punching or drilling.

Together with the reflection factor of the underside of the slats, the size of the perforations and the number thereof substantially determines the transparency of the anti-glare fitment. By having a higher number of perforations, for example, the transparency from the inside to the outside through the anti-glare fitment can be increased. Efficiency is decreased thereby however, which affects the total amount of light admitted into the room. A reasonable compromise has proved to be to have a percentage of perforations in the perforated area of the light-deflecting slat of between 15% and 30%, and preferably of between 15 and 20%. The percentage of perforation is defined as a ratio of the total area of the perforations 6 to the area of the stripe of width b lying in between the perforations. It is advantageous from a technical manufacturing and optical point of view, if the maximum diameter of the perforations is less than 2 mm, and preferably less than 1 mm.

FIG. 5 shows a schematic cross-section of two light-deflecting slats 5 of an embodiment according to the invention. The width of the slats in this specific case is 80 mm, and the distance between the slats is 11 mm. The outer longitudinal edge 5*b* is at the same height as the inner (room side) longitudinal edge 5*a*. The lowest light beam $\mathbf{1}_1$ directly admitted below the horizontal without reflection encompasses only a small negative critical angle $\beta$ to the horizontal X. The light-deflecting slats 5 are—viewed in cross-section—parts of ellipses of the focal points $F_1$, $F_2$ of the longitudinal edges 5*a*, 5*b* of each of the light-deflecting slats lying one above another. Therefore, almost all of the beams striking the reflective upper surface of the slats from outside enter the room with a reflection in accordance with dimming conditions. From the lowest point A to approximately the inner longitudinal edge 5*a*, the light-deflecting slats are perforated and thus also allow a certain view to the outside from slightly diagonally below.

The light-deflecting slats can be hung in a non-tilting, fixed position, which they automatically take up when in a lowered slatted blind. Tiltable hanging of the light-deflecting slats is also perfectly conceivable and possible.

The invention further concerns a deflecting slat of an anti-glare fitment with features according to one of claims 1 to 17.

The invention is of course not limited to the embodiments illustrated. The perforated area, for example, can extend across a larger area of the width of the slat than is illustrated in FIG. 4. Several separate areas of perforations are also conceivable and possible. The perforation does not have to be arranged in the pattern as shown in the example in FIG. 4. The perforations also do not necessarily have to be circular. Perforations which for example are square when viewed from above could also be used to perforate the light-deflecting slats instead.

I claim:

1. Anti-glare fitment with a plurality of elongate light-deflecting slats which are arranged one above another, at a distance from each other, and which are reflective on their upper surface and preferably have a cross section which is upwardly curved in a concave manner, whereby the light-deflecting slats are, at least within an area, perforated.

2. Anti-glare fitment according to claim 1, characterised in that the light-deflecting slats are only perforated in a stripe, running along the longitudinal direction of the slats, which merely takes up part of the width of the slat, while the remaining part of the width of the slat has a continuously closed upper surface.

3. Anti-glare fitment according to claim 1, characterised in that the upper, inner, longitudinal edge of each light-deflecting slat, which faces into a room, is higher in its normal operating position than the upper, outer longitudinal edge which is parallel thereto and faces away from the room.

4. Anti-glare fitment according to claim 2, characterised in that the perforated stripe extends longitudinally along the entire light-deflecting slat and widthwise from approximately the lowest point in the operating position upwards substantially to the inner longitudinal edge.

5. Anti-glare fitment according to claim 1, characterised in that the area which borders the inner longitudinal edge of the light-deflecting slat is provided with a surface which is continuous, that is to say not perforated, preferably a few millimeters in width.

6. Anti-glare fitment according to claim 1, characterised in that the perforation is made through the light-deflecting slats in a preferably regular pattern of perforations which are circular when viewed from above.

7. Anti-glare fitment according to claim 6, characterised in that the perforations are arranged in rows along the longitudinal direction of the slats.

8. Anti-glare fitment according to claim 1, characterised in that the maximum diameter of the perforations which form the perforation is less than 2 mm, and preferably less than 1 mm.

9. Anti-glare fitment according to claim 1, characterised in that the percentage of perforation in the perforated areas of the light-deflecting slats is between 10% and 30%, and preferably between 15% and 20%.

10. Anti-glare fitment according to claim 1, characterised in that the reflective upper surfaces of the light-deflecting slats are formed by a bright metallic surface, preferably an aluminium surface.

11. Anti-glare fitment according to claim 1, characterised in that the reflective upper surfaces of the light-deflecting slats have a reflection factor of more than 85% with a diffusion component of less than 20% in accordance with DIN 5036.

12. Anti-glare fitment according to claim 1, characterised in that the brightness of the reflective upper surface of the light-deflecting slats at an incident angle of 60° is more than 80% in accordance with DIN 67530.

13. Anti-glare fitment according to claim 1, characterised in that the undersides of the light-deflecting slats are matt coated or painted.

14. Anti-glare fitment according to claim 1, characterised in that the reflection factor of the diffusely reflecting undersides of the light-deflecting slats is between 30% and 50%.

15. Anti-glare fitment according to claim 1, characterised in that the light-deflecting slats are hung in a non-tilting, fixed position, which they automatically take up when in a lowered slatted blind.

16. Anti-glare fitment according to claim 1, characterised in that at least a part of the light-deflecting slats—viewed in cross-section—has a substantially elliptical profile, in which a focal point of the elliptical part lies in the region of the outer longitudinal edge of the light-deflecting slat lying on top thereof, preferably lying on this longitudinal edge, and the second focal point lies in the area of the inner longitudinal edge of the light-deflecting slat lying on top thereof.

17. Anti-glare fitment according to claim 1, characterised in that each light-deflecting slat extends into the interior of the room so far that a horizontal plane which includes the inner, upper, longitudinal edge of a light-deflecting slat just forms a tangential plane to the underside of the slat lying on top thereof.

18. Light-deflecting slat of an anti-glare fitment according to claim 1.

* * * * *